United States Patent
Newhall, Jr. et al.

(10) Patent No.: US 7,271,810 B1
(45) Date of Patent: Sep. 18, 2007

(54) SPREAD-COMPENSATED ANISOTROPIC TEXTURE SAMPLING

(75) Inventors: William P. Newhall, Jr., San Francisco, CA (US); Shu-Yi Yu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 386 days.

(21) Appl. No.: 11/069,666

(22) Filed: Mar. 1, 2005

(51) Int. Cl.
G09G 5/00 (2006.01)

(52) U.S. Cl. ............................. 345/582; 582/611

(58) Field of Classification Search ............. None
See application file for complete search history.

(56) References Cited

U.S. PATENT DOCUMENTS

| | | | |
|---|---|---|---|
| 6,005,582 A * | 12/1999 | Gabriel et al. | 345/586 |
| 6,040,837 A | 3/2000 | Wong et al. | |
| 6,292,193 B1 * | 9/2001 | Perry et al. | 345/582 |
| 6,724,395 B1 * | 4/2004 | Treichler | 345/582 |
| 6,947,054 B2 * | 9/2005 | Spangler | 345/582 |

OTHER PUBLICATIONS

Barkans, Anthony C., "High Quality Rendering Using the Talisman Architecture," SIGGRAPH/Eurographics Workshop, 1997.
"Anisotropic Texture Filtering," Meltdown 2/98 Prerelease, Direct3D Reference Rasterizer, Feb. 1998.
Talisman 3D Technology Briefing, Talisman Graphics & Multimedia System, Aug. 1996.
McCormack, Joe, et al., "Feline: Fast Elliptical Lines for Anisotropic Texture Mapping," Mitsubishi Electric Information Technology Center America, 2000.
Greene, Ned, et al., "Creating Raster Omnimax Images from Multiple Perspective Views Using the Elliptical Weighted Average Filter," IEEE Computer Graphics and Applications, vol. 6, Issue 6, pp. 21-27, Jun. 1986.
Williams, Lance, "Pyramidal Parametrics," Computer Graphics, vol. 17, No. 3, Jul. 1983.
Heckbert, Paul S., "Fundamentals of Texture Mapping and Image Warping," *Master's Thesis*, Dept. of Electrical Engineering and Computer Science, University of California, Berkeley, CA, Jun. 17, 1989.
"ATI's Optimized Texture Filtering Called Into Question," Tom's Hardware Guide, Dec. 17, 2004. <http://www20.graphics.tomshardware.com/graphic/20040603/index.html>.
Heckbert, Paul, "Texture Mapping Polygons In Perspective," Computer Graphics Lab, New York Institute of Technology, Technical Memo No. 13, Apr. 28, 1983.

* cited by examiner

*Primary Examiner*—Mark Zimmerman
*Assistant Examiner*—Jwalant Amin
(74) *Attorney, Agent, or Firm*—Patterson & Sheridan, LLP

(57) ABSTRACT

Systems and methods for determining the number of texture samples used to produce an anisotropically filtered texture mapped pixel may improve texture mapping performance or image quality. The number of texture samples may be increased or decreased based on texture state variables that may be specific to each texture map. Furthermore, the texture samples may be positioned along an axis of anisotropy to approximate an elliptical footprint, ensuring that the texture samples span the entire axis of anisotropy. A graphics driver may load the texture state variables and configure a system to modify the number of texture samples and/or position the texture samples used to produce the anisotropically filtered texture mapped pixel.

20 Claims, 13 Drawing Sheets

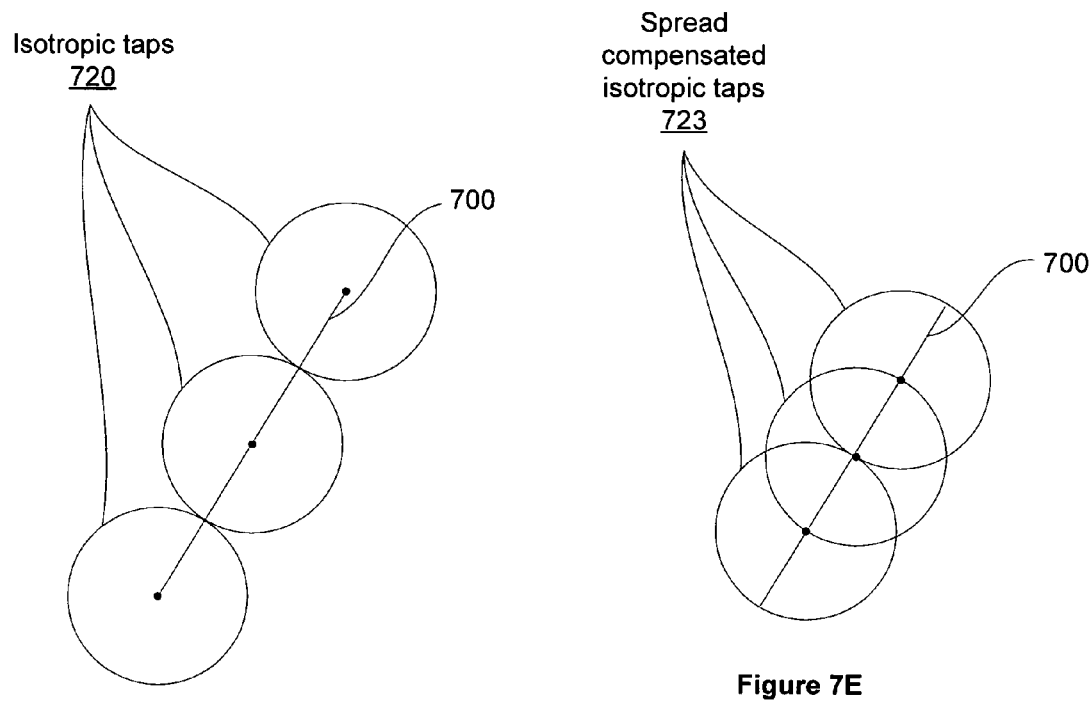
Figure 7D
Figure 7E
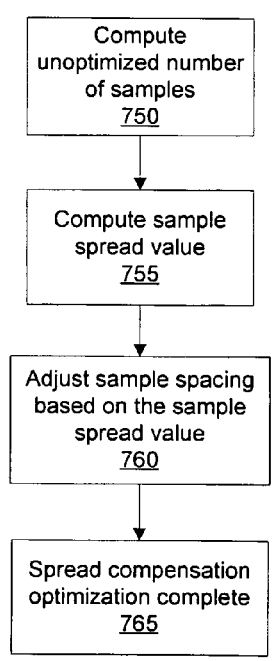
Figure 7F

SPREAD-COMPENSATED ANISOTROPIC TEXTURE SAMPLING

BACKGROUND OF THE INVENTION

1. Field of the Invention

Embodiments of the present invention generally relate to computer graphics, and more particularly to sampling texture map data.

2. Description of the Related Art

Conventional graphics processors are exemplified by systems and methods developed to read and filter texture map samples. To simplify the texture map filtering performed within a graphics processor, a texture is prefiltered and various resolutions forming an image pyramid or "mipmap" are stored. FIG. 1A is a conceptual diagram of prior art showing the levels of a mipmapped texture including the finest level, level 101, and successively lower resolution levels, 102, 103, and 104.

The region in texture space corresponding to a pixel is called the pixel's "footprint". A pixel can be approximated with a circle in screen space. For texture mapping of 2-dimensional textures, the corresponding footprint in texture space can be approximated by an ellipse. In classic use of mipmaps, a mipmap level is chosen so that the footprint when scaled to that level is about 1 texel (texture pixel) in diameter. Then a bilinear filter is used to interpolate between the values of four texels forming a 2×2 square around the footprint center. This is called isotropic filtering, because it filters equally in the two texture space dimensions u and v. Although the filter yielding excellent image quality, the ideal filter, has an approximately elliptical shape, isotropic filtering approximates the ellipse with a circle, to simplify the texture sampling and filtering computations.

In FIG. 1A, a footprint 115 is a pixel footprint in texture space, with a position 135 being the footprint center. FIG. 1B illustrates a prior art application of texture level 101 applied to pixels of a surface 140 that is receding in image space. When viewed in image space, footprint 115 (an ellipse) appears as circle 116. All ellipses have a largest diameter, called the major axis, and a smallest diameter, called the minor axis. Isotropic filtering yields high quality images for pixels whose footprints have major and minor texture axes that are similar in length. But texture stretching, oblique viewing, and perspective can cause footprints to be very elongated, such as footprint 115. When isotropic filtering is used in such situations, a circle is not a good approximation of an ellipse. If the circle is too small (diameter close to the minor axis), the filter is too sharp, too few texels are averaged, and aliasing results. If the circle is too large (diameter close to the major axis), the filter is too broad, too many texels are averaged, and blurring results. Anisotropic texture filtering addresses this problem by using a filter that more closely matches the elliptical shape of the ideal filter.

FIG. 1C illustrates footprint 115 including a minor axis 125 that is significantly shorter than a major axis 130. Texture samples along major axis 130, the axis of anisotropy, are read from one or more mipmap levels and are blended to produce a pixel color. The level from which the samples are read is determined using a level of detail (LOD) value which is nominally the log base 2 of the length of minor axis 125. The number of texture samples read from the texture map is determined based on the ratio of the major axis to the minor axis, with more texture samples needed as the ratio increases, i.e. as the ellipse becomes more elongated.

FIG. 1D illustrates five isotropic taps 140 that are positioned along major axis 130 to approximate an elliptical footprint, such as footprint 115. Each isotropic tap 140 corresponds to an isotropically filtered texture sample that is computed using conventional bilinear or trilinear isotropic filtering. Isotropic taps 140 are filtered to produce an anisotropically filtered texture sample corresponding to pixel 116. Isotropic taps 140 oftentimes extend beyond major axis 130, and therefore include texture samples which lie outside of the elliptical footprint, possibly resulting in visual artifacts such as blurring. The number of samples, spacing of the samples, and LOD should be determined such that the isotropic taps lie within the elliptical footprint.

FIG. 1E illustrates three isotropic taps 150 that are positioned along major axis 130 to approximate an elliptical footprint, such as footprint 115. In order to improve anisotropic texture mapping performance, the number of samples taken along major axis 130, the axis of anisotropy, is reduced from five to three, effectively decreasing the length of major axis 130. Unlike isometric taps 140, isotropic taps 150 do not cover major axis 130, and therefore texture samples which lie within the elliptical footprint are not filtered, possibly resulting in visual artifacts such as aliasing. Although performance is improved, the visual artifacts that may be introduced may cause decreased image quality. The number of samples, spacing of the samples, and LOD should be determined such that the isotropic taps cover the elliptical footprint.

Accordingly, there is a need to balance the performance of anisotropic texture mapping with image quality when performing anisotropic texture mapping.

SUMMARY OF THE INVENTION

The current invention involves new systems and methods for determining the number and spacing of texture samples to use to produce an anisotropically filtered texture mapped pixel. The number of texture samples along a line of anisotropy may be increased or decreased based on texture state variables that may be specific to each texture map. The systems and methods may be used to position the number of texture samples along an axis of anisotropy to approximate an elliptical footprint, ensuring that the texture samples span the entire axis of anisotropy with or without gaps between the texture samples. A graphics driver may load the texture state variables and configure a system to modify the number of texture samples and/or position the texture samples used to produce the anisotropically filtered texture mapped pixel. Image quality and performance may be balanced based on the texture state variables and configuration modes.

Various embodiments of a method of the invention for determining anisotropic texture map sample positions include computing an optimized number of texture map samples aligned along a major axis of anisotropy, computing an unoptimized number of texture map samples aligned along the major axis of anisotropy, and adjusting the distance between texture map samples along the major axis of anisotropy in proportion to a ratio between the unoptimized number of texture map samples and the optimized number of texture map samples.

Various embodiments of the invention include a system for determining anisotropic texture map sample positions. The system includes means for computing an optimized number of texture map samples aligned along a major axis of anisotropy, means for computing an unoptimized number of texture map samples aligned along the major axis of anisotropy, and means for repositioning the optimized number of texture map samples along the major axis of anisotropy based on a ratio between the unoptimized number of texture map samples and the optimized number of texture map samples.

Various embodiments of the invention include a programmable graphics processor for generating images using anisotropically filtered texture samples.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7D is another diagram of isotropic taps for approximating an anisotropic footprint in accordance with one or more aspects of the present invention.

FIG. 7E is another diagram of spread compensated isotropic taps for approximating an anisotropic footprint in accordance with one or more aspects of the present invention.

FIG. 7F illustrates an embodiment of a method for positioning texture samples along an anisotropic axis for anisotropic filtering in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The major and minor axes of anisotropy define a footprint that represents the projection of the pixel onto the texture map. Isotropic taps are positioned along the axis of anisotropy (the major axis) to approximate the footprint. The number of isotropic taps determines the number of texture samples which are filtered to produce an anisotropically filtered texture pixel. The number of isotropic taps may be reduced to improve performance of anisotropic texture mapping. Conversely, the number of isotropic taps may be increased to improve image quality when performing anisotropic texture mapping. The isotropic taps may also be repositioned to improve image quality. Furthermore, texture state variables may be specified for each texture map to control the number of isotropic taps and positioning of the isotropic taps used during anisotropic texture mapping.

Figure 1A:
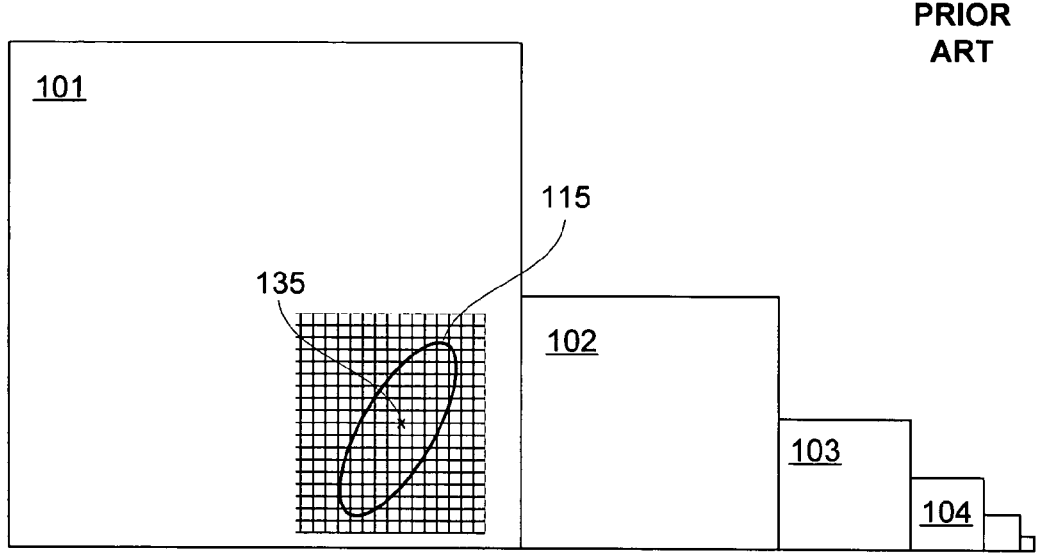
FIG. 1A is a conceptual diagram of prior art showing a mipmapped texture.
Figure 1B:
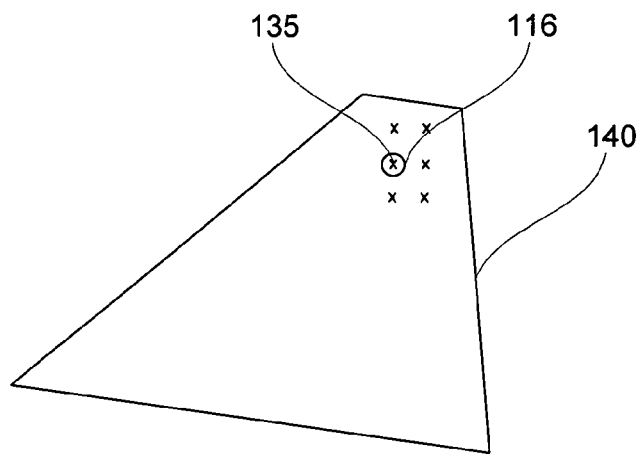
FIGS. 1B and 1C illustrate a prior art application of texture samples to a surface.
Figure 1C:
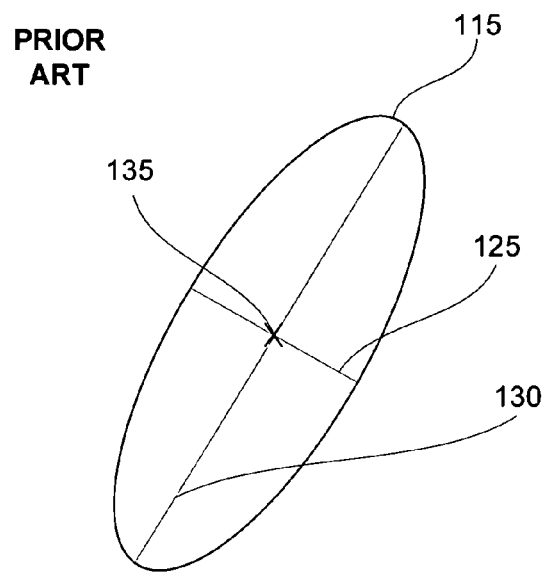
Figure 1D:
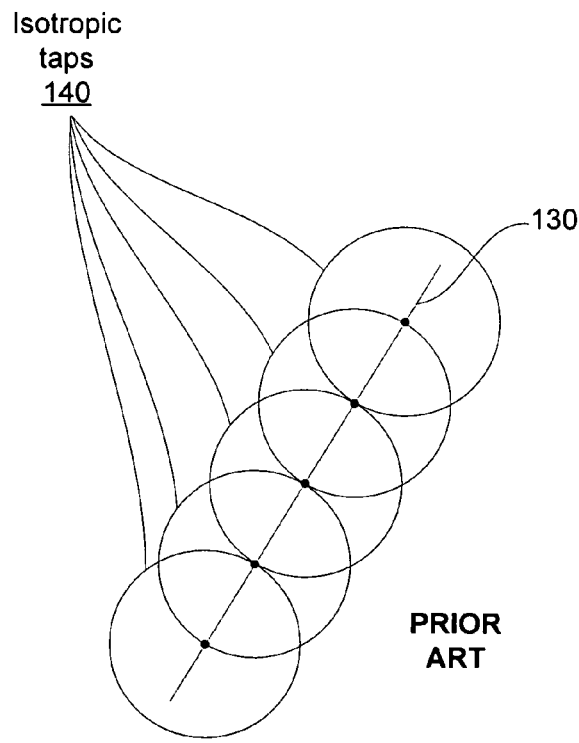
FIGS. 1D and 1E illustrate a prior art application of isotropic taps that are positioned along a major axis to approximate an elliptical footprint.
Figure 1E:
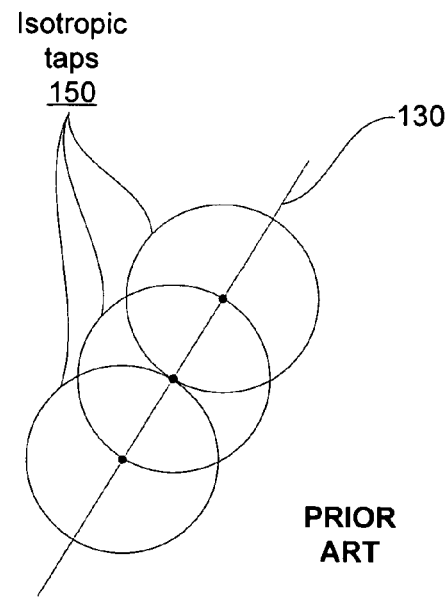
Figure 2:
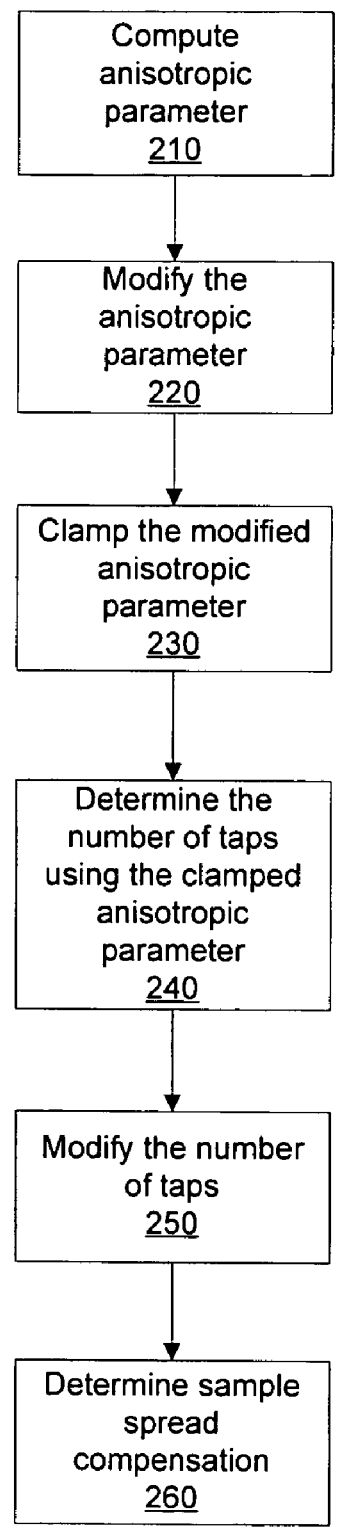
FIG. 2 illustrates an embodiment of a method for computing the number and position of isotropic taps for anisotropic filtering in accordance with one or more aspects of the present invention.

FIG. 2 illustrates an embodiment of a method for computing the number and position of texture samples for anisotropic filtering in accordance with one or more aspects of the present invention. In step 210 techniques known to those skilled in the art are used to compute an anisotropic parameter for a pixel footprint in texture space. In some embodiments of the present invention, the parameter is a logratio value is equivalent to the base-two logarithm (log) of an anisotropic ratio of the minor axis length to the major axis length. A base-two log of the major axis length may be computed to produce a logmajor value and a base-two log of the minor axis length may be computed to produce a logminor value. The logratio value is then computed by subtracting the logmajor value from the logminor value. The logratio value ranges from −4 to 0, where a logratio value of −4 corresponds to a maximum anisotropy of 16:1 and 0 indicates an isotropic footprint. Increasing the logratio value decreases the number of isotropic taps used to approximate the footprint. Performing computations in log space simplifies the computations and may be more efficient; for example, subtraction in log space is used instead of division. Likewise, addition is used instead of multiplication.

In other embodiments of the present invention, the anisotropic parameter computed in step 210 is the anisotropic ratio of the lengths of the minor axis to the major axis. The anisotropic ratio may range from 1/n to 1, where n is the maximum anisotropy and 1 indicates an isotropic footprint.

Similar to the logratio value, increasing the anisotropic ratio decreases the number of isotropic taps used to approximate the footprint.

In some embodiments of the present invention the anisotropic parameter is optionally modified in step 220. For example, an "anisotropic bias" term may be added to the anisotropic parameter effectively fattening the footprint and reducing the number of isotropic taps when the anisotropic parameter is close to the boundary between two levels of anisotropy. Fattening the footprint results in a larger mipmap LOD value. In some embodiments of the present invention, mipmap levels are numbered such that level 0 is the highest resolution, "base" level, and level k is half the size in each dimension of level k–1, for all k up to the apex of the pyramid. Increasing the LOD value effectively increases the diameter of each isotropic tap since the texture samples are read from a lower resolution mipmap. Other optimizations to modify the anisotropic parameter are described below in conjunction with FIG. 4.

In step 230 the modified anisotropic parameter is clamped to a minimum value to produce a clamped anisotropic parameter that is not less than the minimum value. The clamping may be performed based on a maximum allowed anisotropy setting. For example, in some embodiments of the present invention, the maximum allowed anisotropy may be programmed as n:1, where n is 8 or 16. When logratio is the anisotropic parameter, it is clamped to a value that is greater than or equal to the negative of the base-two log of the maximum allowed anisotropy. The target level of detail, LODt, is base-two log of the length of the minor axis. LODt is then defined as the sum of logmajor and the clamped logratio. When the anisotropic parameter is the anisotropic ratio, it is clamped to 1/n and LODt is base-two log of the product of the modified ratio and the length of the major axis. In other embodiments of the present invention, the modified anisotropic parameter may be clamped to a maximum value based on the maximum allowed anisotropy setting.

Using LODt has the effect of keeping the major axis fixed, while permitting steps 220 and/or 230 to fatten the footprint, increasing its minor axis. Fattening the footprint results in a little blurring. Shortening the major axis, on the other hand, would add aliasing, which is usually more objectionable. The processing time cost of anisotropic filtering for a pixel is typically proportional to the anisotropy of its footprint, so fattening the footprint may improve performance. Isotropic filtering is simply the special case of anisotropic filtering where the maximum allowed anisotropy is 1.

Generally, when performing anisotropic filtering with trilinear interpolation between mipmap levels for each isotropic tap, the two LODs should be calculated as follows. The fine texture map LOD, LODfine, is set to the integer portion of LODt, and the coarse level LOD, LODcoarse, is set to LODfine+1. Interpolation between the two levels is performed according to the LODfrac parameter, which equals the fractional part of LODt. When performing anisotropic filtering with bilinear (not trilinear) filtering for each isotropic tap, the single LODfine is calculated by rounding LODt to the nearest integer. LODcoarse and LODfrac are irrelevant for bilinear filtering.

In step 240 the number of isotropic taps is determined using the clamped anisotropic parameter. When the logratio is the anisotropic parameter, the number of isotropic taps is computed as follows:

$$\text{number of isotropic taps} = 2^{-(clamped\ logratio)}.$$

When the anisotropic ratio is the anisotropic parameter, the number of isotropic taps is computed as follows:

$$\text{number of isotropic taps} = 1/(\text{clamped ratio}).$$

In step 250 the number of isotropic taps determined in step 240 may be modified using techniques described below in conjunction with FIGS. 2, 3, and 6B. In step 260 a sample spread compensation value may be determined using techniques described below in conjunction with FIG. 7F. If optimizations reduce the number of isotropic taps used for the footprint causing portions of the axis of anisotropy to become unsampled, i.e., not covered by an isotropic tap, then mid-band frequency texture data may produce alias artifacts. A spread compensation value is used to reposition the isotropic taps along axis of anisotropy so that small unsampled regions are distributed evenly across the footprint instead of leaving larger unsampled regions at opposing ends of the footprint.

One or more of steps 220, 250, and 260 may be omitted for some embodiments of the present invention. Furthermore, two or more techniques may be used in combination to modify the anisotropic parameter and/or reduce the number of isotropic taps. Other techniques known to those skilled in the art may be used to compute an anisotropic parameter, LOD, and/or the number of isotropic taps. Persons skilled in the art will appreciate that any system configured to perform the method steps of FIG. 2 or their equivalents, is within the scope of the present invention.

Figure 3:
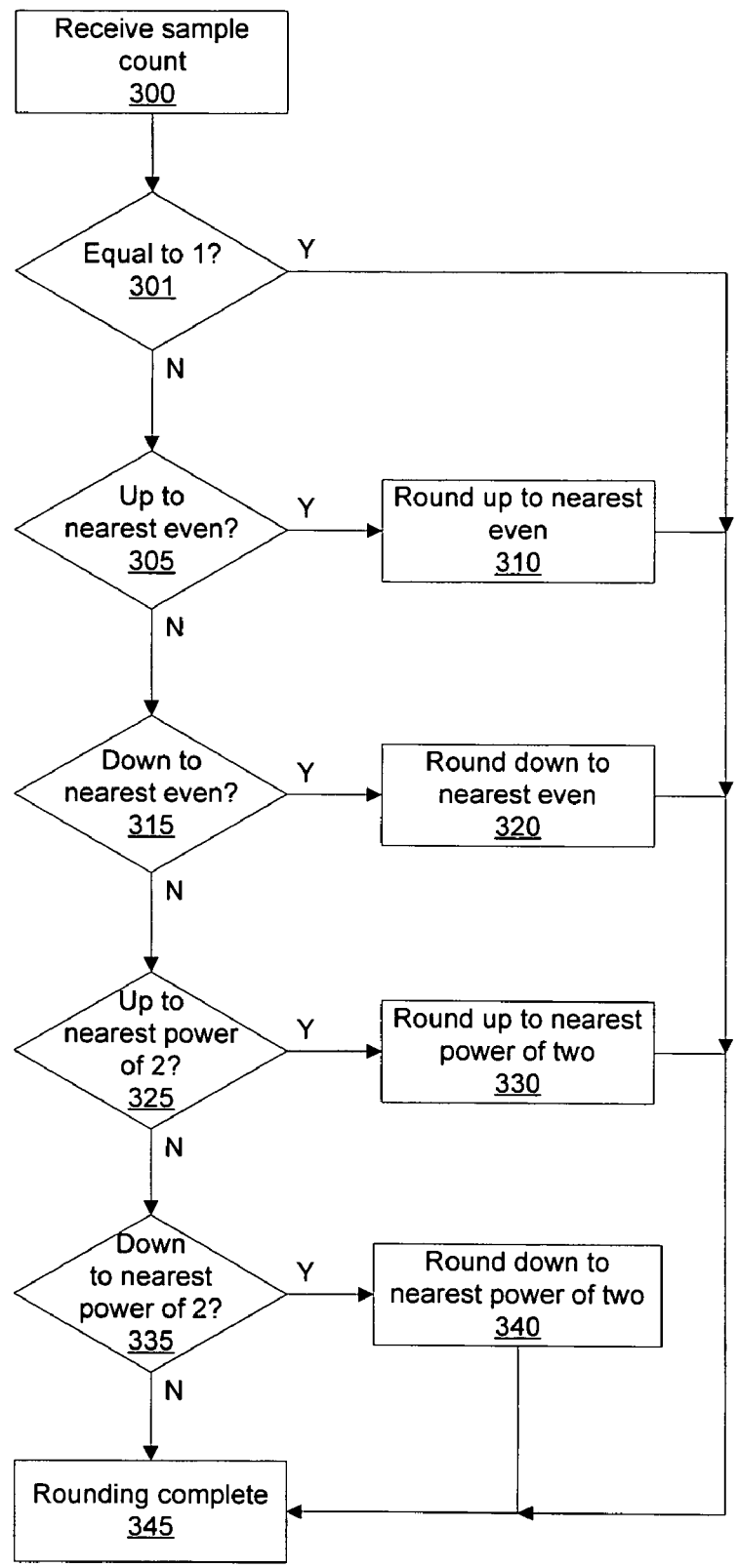
FIG. 3 illustrates an embodiment of a method for modifying the number of samples for anisotropic filtering in accordance with one or more aspects of the present invention.

FIG. 3 illustrates an embodiment of a method for modifying the number of samples, e.g., isotropic taps, for anisotropic filtering in accordance with one or more aspects of the present invention. This method may be used to perform step 250 of FIG. 2 or may be combined with one or more other techniques for modifying the number of samples to produce the modified number of samples. The number of samples may be reduced or increased using rounding rules to optimize anisotropic filtering. In some embodiments of the present invention, the rounding rules may be provided by a user through a user interface, either directly or indirectly. For example, the user may indirectly select a rounding rule to reduce the number of samples by selecting a high performance mode. In another example, the user may indirectly select a rounding rule to increase the number of samples by selecting a high image quality mode. A rounding rule may be determined for a given texture map by analyzing that texture map. A graphics driver may be configured to load a rounding rule or specify a preloaded rounding rule for each texture map that is used to produce an image.

The method begins in step 300 where a sample count, i.e., number of samples, is received. The sample count may be a value ranging from 1 to n, where 1 indicates isotropic filtering and n is the maximum anisotropy, e.g., 8, 16, or more. In step 301 the sample count is checked and, if it is equal to one, the method proceeds to step 345 and the rounding optimization is complete. If, in step 301 the sample count is not equal to one, the method proceeds to step 305.

In step 305 a configuration mode is checked and, if a round "up to nearest even" rule is specified, then in step 310 the sample count is rounded up to the nearest even integer to produce the modified number of samples with the exception of a sample count of 1 which is not rounded up. For example, if the sample count received in step 300 is 3, the sample count is rounded to 4 in step 310. After completing step 310, the method proceeds to step 345 and the rounding optimization is complete.

If, in step 305 the round "up to nearest even" rule is not specified, then in step 315 it is determined if a round "down to nearest even" rule is specified. If the round "down to nearest even" rule is specified, then in step 320 the sample count is rounded down to the nearest even integer. For example, if the sample count received in step 300 is 3, the sample count is rounded to 2 in step 320. After completing step 320, the method proceeds to step 345 and the rounding optimization is complete.

If, in step 315 the round "down to nearest even" rule is not specified, then in step 325 it is determined if a round "up to nearest power of 2" rule is specified. If the round "up to nearest power of 2" rule is specified, then in step 330 the sample count is rounded up to the nearest power of two. For example, if the sample count received in step 300 is 5, the sample count is rounded to 8 in step 330. After completing step 330, the method proceeds to step 345 and the rounding optimization is complete.

If, in step 325 the round "up to nearest power of 2" rule is not specified, then in step 335 it is determined if a round "down to nearest power of 2" rule is specified. If the round "down to nearest power of 2" rule is specified, then in step 340 the sample count is rounded down to the nearest power of two. For example, if the sample count received in step 300 is 7, the sample count is rounded to 4 in step 340. After completing step 340, the method proceeds to step 345 and the rounding optimization is complete.

Table 1 illustrates the rounding rule optimization for the four different rounding rules when the number of samples ranges from 1.0 to 16.0. In other embodiments of the present invention the maximum number of samples may not be limited to 16 and different rounding rules may be used to modify the number of samples. Persons skilled in the art will appreciate that any system configured to perform the method steps of FIG. 3, or their equivalents, is within the scope of the present invention.

TABLE 1

| Number of samples | Round up to even | Round down to even | Round up to power of 2 | Round down to power of 2 |
|---|---|---|---|---|
| 1.0 | 1 | 1 | 1 | 1 |
| 2.0 | 2 | 2 | 2 | 2 |
| 3.0 | 4 | 2 | 4 | 4 |
| 4.0 | 4 | 4 | 4 | 4 |
| 5.0 | 6 | 4 | 8 | 4 |
| 6.0 | 6 | 6 | 8 | 4 |
| 7.0 | 8 | 6 | 8 | 4 |
| 8.0 | 8 | 8 | 8 | 8 |
| 9.0 | 10 | 8 | 16 | 8 |
| 10.0 | 10 | 10 | 16 | 8 |
| 11.0 | 12 | 10 | 16 | 8 |
| 12.0 | 12 | 12 | 16 | 8 |
| 13.0 | 14 | 12 | 16 | 8 |
| 14.0 | 14 | 14 | 16 | 8 |
| 15.0 | 16 | 14 | 16 | 8 |
| 16.0 | 16 | 16 | 16 | 16 |

Figure 4:
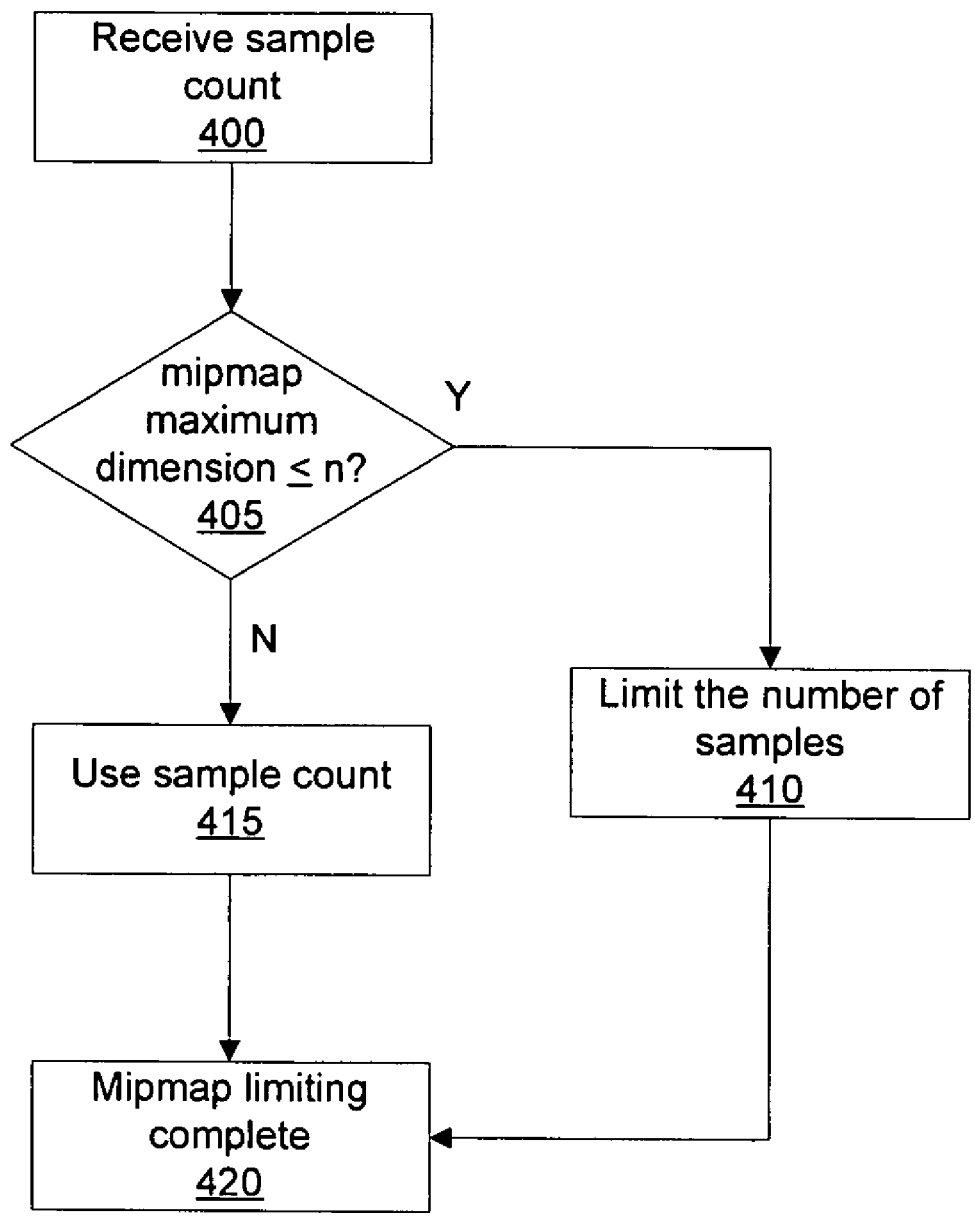
FIG. 4 illustrates another embodiment of a method for modifying the number of samples for anisotropic filtering in accordance with one or more aspects of the present invention.

FIG. 4 illustrates another embodiment of a method for modifying the number of samples, e.g., isotropic taps, for anisotropic filtering in accordance with one or more aspects of the present invention. This method may also be used to perform step 250 shown in FIG. 2 or may be combined with one or more other techniques, such as the rounding rule optimization, for modifying the number of samples to produce the modified number of samples.

The number of samples may be reduced using limits based on mipmap resolution to optimize anisotropic filtering. In a "wide horizon" scenario, the most extreme anisotropy occurs close to the horizon at low texture resolution. Rather than filtering many samples from low resolution mipmaps, the number of samples is limited based on the mipmap resolution. For example, when the maximum dimension of a mipmap is 2, the maximum number of samples may be limited to 4, since 4 is the maximum number of texels in that mipmap.

In some embodiments of the present invention, the mipmap limits for one or more mipmap levels may be provided by a user through a user interface, either directly or indirectly. For example, the user may indirectly select mipmap limits to reduce the number of samples by selecting a high performance mode. In another example, the user may indirectly select mipmap limits to increase the number of samples by selecting a high image quality mode. A set of mipmap limits may be determined for a given texture map by analyzing that texture map. In particular, mipmap limits may be specified for mipmap levels which have less high frequency content. A graphics driver may be configured to load a set of mipmap limits or specify a set of preloaded mipmap limits for each texture map that is used to produce an image.

The method begins in step 400 where a sample count, i.e., number of samples, is received. The sample count may be a value ranging from 1 to n, where 1 indicates isotropic filtering and n is the maximum anisotropy, e.g., 8, 16, or more. In step 405, a maximum dimension of the mipmap corresponding to the LODt, LODfine, LODcoarse, or the like, for a pixel is compared with the maximum anisotropy, such as 16. In other embodiments of the present invention, other values may be compared to the maximum dimension, up to and including the maximum resolution of the highest resolution mipmap. When the maximum dimension is greater than the maximum anisotropy, the method proceeds to step 415, and the modified number of samples is set to the sample count received in step 400. The method then proceeds to step 420 and the mipmap limiting optimization is complete.

If, in step 405 the maximum dimension is not greater than the maximum anisotropy, then in step 410 the number of samples used to anisotropically filter the pixel is limited according to the set of mipmap limits for the specific texture map. For example, if a mipmap limit for the mipmap level corresponding to LODt, LODfine, LODcoarse, or the like, computed for the pixel is specified as 4 and the sample count received in step 400 is greater than 4, the number of samples is limited to the specified mipmap limit of 4. In step 410 the modified number of samples is limited to the mipmap limit corresponding to LODt, LODfine, LODcoarse, or the like, for the pixel. After completing step 410, the method proceeds to step 420, and the mipmap limiting optimization is complete.

In some embodiments of the present invention, when a maximum anisotropy is 16, mipmap levels with a maximum dimension of 16 or fewer texture samples may each have a mipmap limit of 1, 2, 4, or 16 texture samples. The set of mipmap limits for a texture map includes the mipmap limit for each mipmap level for which a mipmap limit is specified. Persons skilled in the art will appreciate that any system configured to perform the method steps of FIG. 4, or their equivalents, is within the scope of the present invention.

Figure 5A:
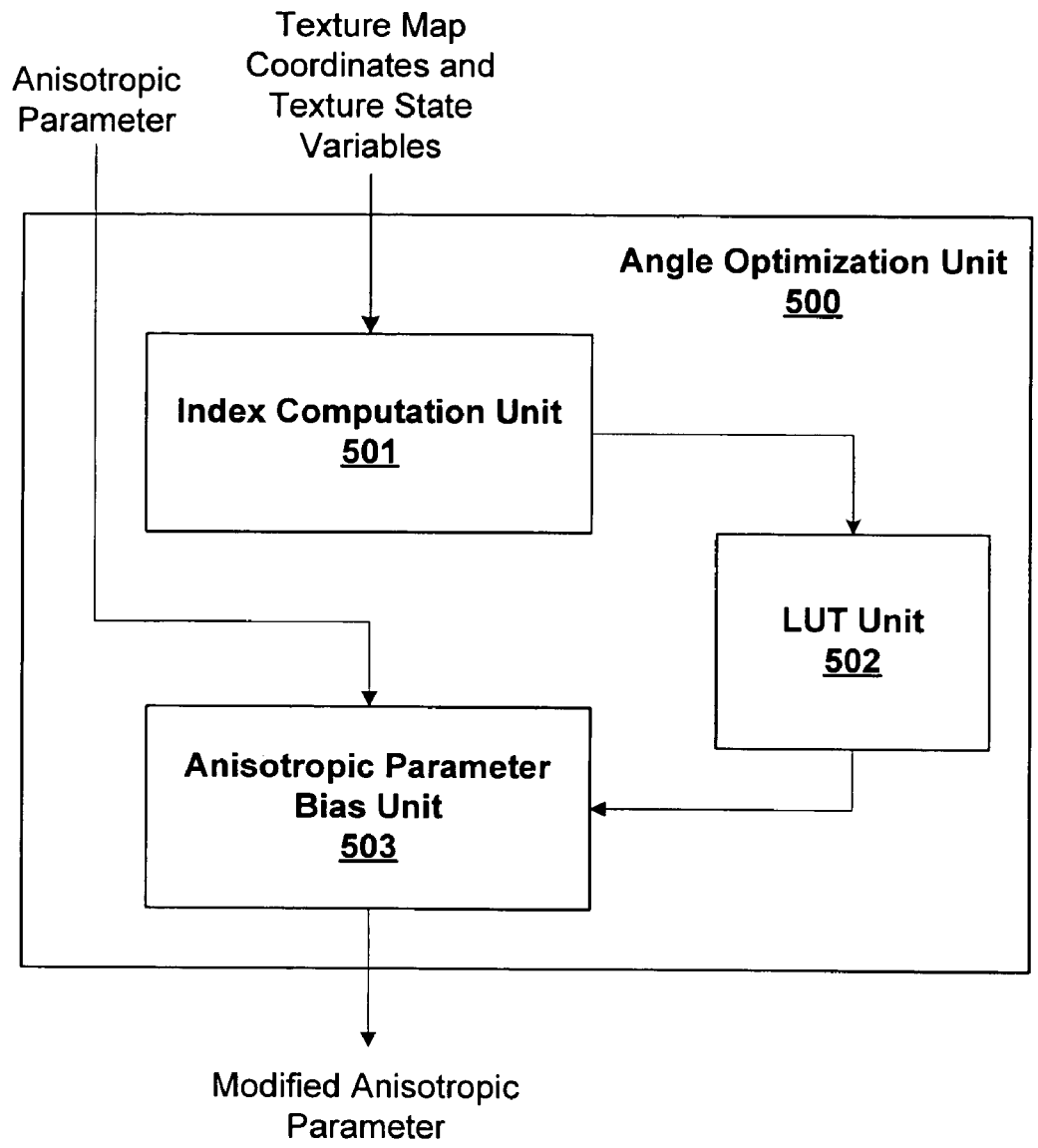
FIG. 5A is a block diagram of an exemplary embodiment of an angle optimization unit in accordance with one or more aspects of the present invention.

The rounding rule optimization and mipmap limiting optimization each modify the number of samples. In contrast, another optimization, referred to as angle optimization, modifies the anisotropic parameter. FIG. 5A is a block diagram of an exemplary embodiment of an angle optimization unit 500 in accordance with one or more aspects of the present invention. An index computation unit 501 receives texture map coordinates, such as u and v, and texture state variables and outputs an angle index. The texture state variables specify a set of angle biases to use for a particular texture.

Some textures have directionally correlated data which only require anisotropic sampling in one or two directions while other textures may include data which are directionally correlated in several directions. The angle biases for each texture may be determined based on analysis of the particular texture map. A graphics driver may be configured to load a set of angle biases or specify a set of preloaded angle biases for each texture map that is used to produce an image. The angle biases may be used to modify the anisotropic parameter to increase the number of samples and improve image quality or reduce the number of samples and improve anisotropic texture mapping performance.

Index computation unit 501 outputs the computed angle index to LUT (lookup table) unit 502. LUT unit 502 may be preloaded by a graphics driver to include angle biases for at least one texture map. In one embodiment of the present invention, LUT unit 502 includes four smaller LUTs, each of which corresponds to a specific angle optimization selection. The texture state variables specify which of the four smaller LUTs to access. Each of the four smaller LUTs includes sixteen entries, where each entry corresponds to an angle bias for a predetermined angle of the line of anisotropy for a pixel. The computed index is based on the angle of the line of anisotropy for the pixel and is used to read an entry from one of the four smaller LUTs. In another embodiment of the present invention, LUT unit 502 includes 16 LUTs and each LUT has 8 entries.

Table 2 illustrates sixteen entries which may be stored in one of the four smaller LUTs within LUT unit 502. The first column is the index and the second column is the angle bias which is read from the LUT. In other embodiments of the present invention, fewer or more entries may be stored in a table. For example, the angle bias may be stored as a 4 bit value which is scaled by 32 and decremented by 256 after being read from the LUT. The third column of Table 2 represents an effective scale factor that is applied to the number of samples as a result of using the angle optimization to modify the anisotropic parameter. The number of samples is effectively scaled by the scale factor to produce the modified number of samples. Therefore, the angle optimization may be used to increase or decrease the number of samples used for anisotropic filtering.

TABLE 2

| Index | Angle bias | Scale factor |
|---|---|---|
| 0 | −256 | 0.5 |
| 1 | −224 | 0.545254 |
| 2 | −192 | 0.594604 |
| 3 | −160 | 0.64842 |
| 4 | −128 | 0.707107 |
| 5 | −96 | 0.771105 |
| 6 | −64 | 0.840896 |
| 7 | −32 | 0.917004 |
| 8 | 0 | 1 |
| 9 | 32 | 1.090508 |
| 10 | 64 | 1.189207 |
| 11 | 96 | 1.29684 |
| 12 | 128 | 1.414214 |
| 13 | 160 | 1.542211 |
| 14 | 192 | 1.681793 |
| 15 | 224 | 1.834008 |

The angle bias read from an entry in LUT unit 502 is output to an anisotropic parameter bias unit 503. Anisotropic parameter bias unit 503 receives the anisotropic parameter and applies the angle bias by summing it with the anisotropic parameter to produce a modified anisotropic parameter. The scale factor is applied to isotropic texture sample spacing. For example, the scale factor may be used to scale texture space coordinate, e.g., u and v, gradients. In other embodiments of the present invention, the modified anisotropic parameter may be produced using processing units to compute the angle bias instead of using a LUT.

Figure 5B:
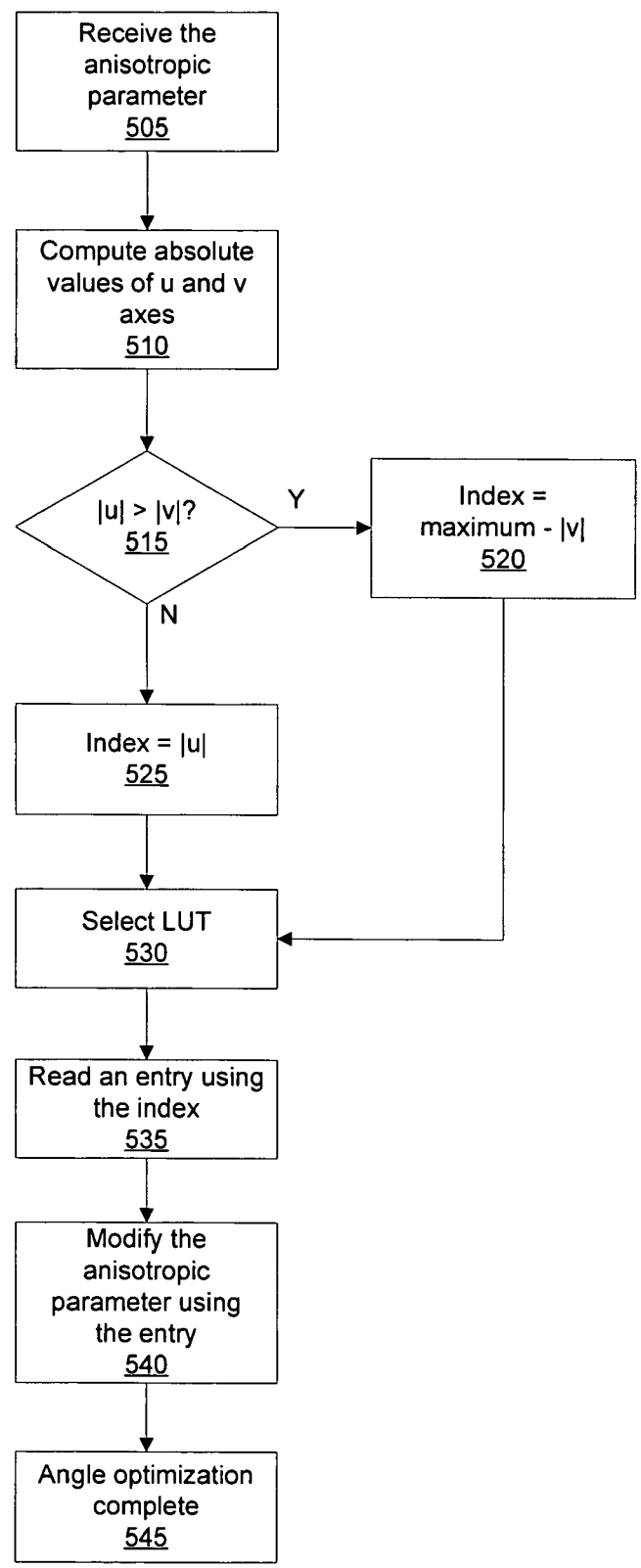
FIG. 5B illustrates an embodiment of a method for modifying an anisotropic parameter for anisotropic filtering in accordance with one or more aspects of the present invention.

FIG. 5B illustrates an embodiment of a method for modifying the anisotropic parameter to perform angle optimization in accordance with one or more aspects of the present invention. This method may be used to perform step 220 shown in FIG. 2 or may be combined with one or more other techniques for modifying the anisotropic parameter to produce the modified anisotropic parameter.

In step 505 the anisotropic parameter, e.g., logratio, anisotropic ratio, or the like, is received. In step 510 the absolute values of the u and v texture map coordinate components of the axis of anisotropy are computed by index computation unit 501. In step 515, index computation unit 501 determines if the absolute value of the u component is greater than the absolute value of the v component, and, if so, in step 520 the index is computed by subtracting the absolute value of the v component from a maximum value. In some embodiments of the present invention, the absolute value of the v component ranges from 0x0 to 0x3f and is divided by 4 to obtain a value between 0x0 and 0xf, which is then subtracted from a maximum value of 0x1f to produce the index. Each index produced in this fashion corresponds to one of 16 entries.

If, in step 515 index computation unit 501 determines the absolute value of the u component is not greater than the absolute value of the v component, then in step 525 the index is the absolute value of the u component which may range from 0x0 to 0x3f. In some embodiments of the present invention, the index is the absolute value of the u component divided by 4, and therefore ranges from 0x0 to 0xf. Again, the index corresponds to one of 16 entries. In some embodiments of the present invention, the LUT is not symmetric along the |u|=|v| axis and additional entries are included in the LUT corresponding to index=|v|.

In step 530 LUT unit 502 uses the texture state variables to select one of the four smaller LUTs within LUT unit 502. In other embodiments of the present invention, the texture state variables may be included within the index and used to access a portion of a LUT within LUT unit 502. In step 535 LUT unit 502 uses the index to read an entry storing an angle bias. In some embodiments the index is used to read one of 16 entries within one of the four LUTs within LUT unit 502. In step 540 anisotropic parameter bias unit 503 receives the angle bias from LUT unit 502 and sums it with the anisotropic parameter, e.g., logratio, to produce the modified anisotropic parameter. Alternatively, anisotropic parameter bias unit 503 may be configured to scale the anisotropic parameter, e.g., anisotropic ratio, by the angle bias to produce the modified anisotropic parameter. In step 545 the angle optimization is complete and the modified anisotropic parameter may be used to compute LODt, the number of samples, and the like. Persons skilled in the art will appreciate that any system configured to perform the method steps of FIG. 5B or their equivalents, is within the scope of the present invention.

Another embodiment of a method for modifying the number of samples, e.g., isotropic taps, for anisotropic filtering is a uv optimization. This method may also be used to perform step 250 shown in FIG. 2 or may be combined with one or more other techniques, such as the rounding rule optimization, mipmap limiting optimization, or angle optimization, for modifying the number of samples to produce the modified number of samples.

Figure 6A:
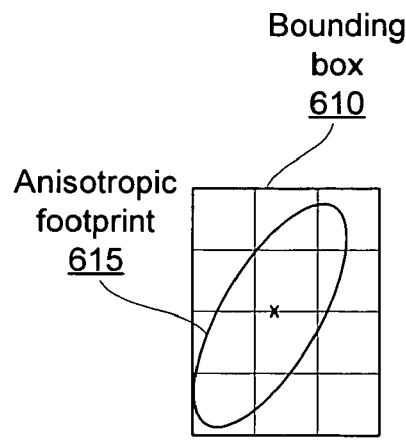
FIG. 6A is a conceptual diagram of an anisotropic footprint in accordance with one or more aspects of the present invention.

FIG. 6A is a conceptual diagram of an anisotropic footprint 615 in accordance with one or more aspects of the present invention. A bounding box 610 represents the u and v texture coordinates bounding the anisotropic footprint. Bounding box 610 includes 12 distinct texels which may be accessed using the u and v texture coordinates. The uv optimization limits the number of samples to a maximum value that is not greater than the number of texels within a bounding box of a footprint, such as bounding box 610 of anisotropic footprint 615.

Figure 6B:
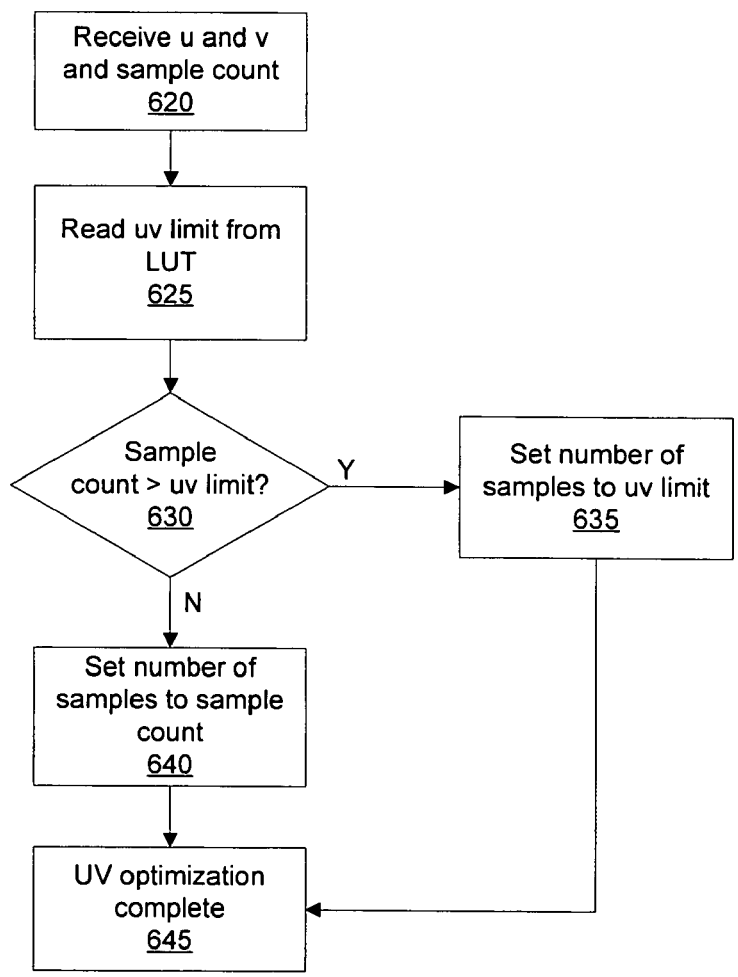
FIG. 6B illustrates another embodiment of a method of modifying the number of texture samples for anisotropic filtering in accordance with one or more aspects of the present invention.

FIG. 6B illustrates another embodiment of the uv optimization method of modifying the number of samples for anisotropic filtering in accordance with one or more aspects of the present invention. In step 620 the sample count and u and v texture coordinates are received. In step 625 a low resolution two-dimensional LUT is accessed using the u and v texture coordinates received in step 620 to read a uv limit value. The LUT stores uv limit values indicating the number of texels bounded by an anisotropic footprint defined by the u and v texture coordinates. In one embodiment of the present invention, 3 LUTs are used, a horizontal LUT, a vertical LUT, and a diagonal LUT. When v is small compared with u, the horizontal LUT is read. When u is small compared with v, the vertical LUT is read. Otherwise, the diagonal LUT is read.

In step 630 the sample count received in step 620 is compared to the uv limit value read from the LUT, and, if the sample count is not greater than the uv limit value, then in step 645 the number of samples is set to the sample count received in step 620. The method then proceeds to step 645 and the uv optimization is complete. If, in step 630 the sample count is greater than the uv limit value, then in step 635 the number of samples is set to the uv limit value, thereby limiting the number of samples to the number of texels contained within bounding box 610. The method then proceeds to step 645 and the uv optimization is complete. Persons skilled in the art will appreciate that any system configured to perform the method steps of FIG. 6B or their equivalents, is within the scope of the present invention.

Figure 7A:
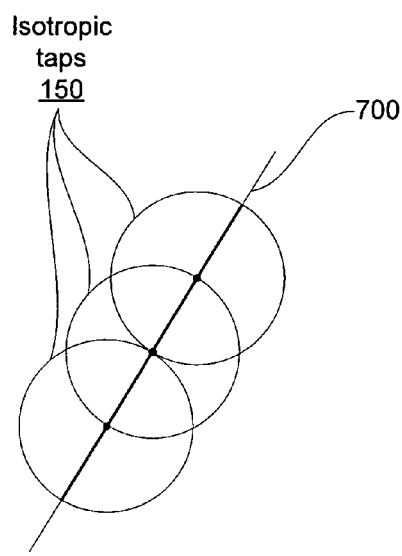
FIG. 7A is a diagram of isotropic taps for approximating an anisotropic footprint in accordance with one or more aspects of the present invention.
Figure 7B:
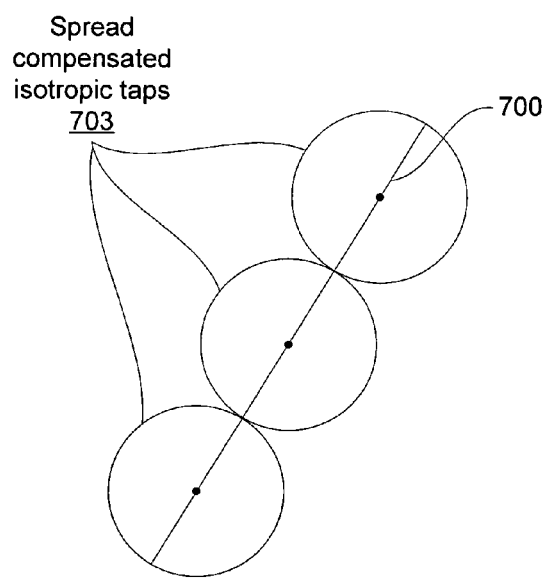
FIGS. 7B and 7C are diagrams of spread compensated isotropic taps for approximating an anisotropic footprint in accordance with one or more aspects of the present invention.

When the modified number of samples is less than the original number of samples, the samples may not extend to cover the entire length of the axis of anisotropy, potentially resulting in the introduction of visual artifacts such as aliasing of mid-band frequencies. FIG. 7A is a diagram of 3 samples, isotropic taps 701, for approximating an anisotropic footprint in accordance with one or more aspects of the present invention. Isotropic taps 701 are positioned along an axis of anisotropy 700, but do not cover the entire length of axis of anisotropy 700. Isotropic taps 701 may be repositioned to cover the entire length of axis of anisotropy 700 using spread compensation, as described in conjunction with FIG. 7F. The result of such a repositioning is shown in FIG. 7B where the repositioned isotropic taps 701 are shown as spread compensated isotropic taps 703. Spread compensated isotropic taps 703 provide a more accurate approximation of the anisotropic footprint and may therefore result in a higher quality image without requiring any additional samples.

Figure 7C:
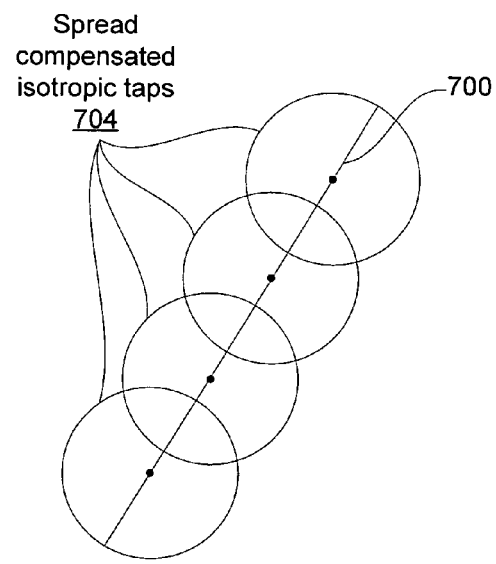

In some cases, isotropic taps repositioned using spread compensation may span an entire axis of anisotropy even introducing gaps between the repositioned isotropic taps. Image quality improves when small areas of texels between the repositioned isotropic taps are not sampled in comparison with leaving large unsampled regions at opposing ends of the elliptical footprint. Increasing the number of isotropic taps, for example by increasing the LOD, may eliminate the gaps and further improve image quality. FIG. 7C is a diagram of using 4 samples, spread compensated isotropic taps 704, to approximate the anisotropic footprint in accordance with one or more aspects of the present invention. Like spread compensated isotropic taps 703, spread compensated isotropic taps 704 are evenly distributed along the entire length of axis of anisotropy 700. Because an additional sample is used, a higher quality image may result when spread compensated isotropic taps 704 are used instead of spread compensated isotropic taps 703 to produce an anisotropically filtered pixel.

Using spread compensation to reposition isotropic taps along axis of anisotropy 700 eliminates large gaps at the end of axis of anisotropy 700, while possibly introducing several smaller gaps that are more evenly distributed along axis of anisotropy 700. As a consequence, any aliasing artifacts are less noticeable, even when the number of samples has been significantly reduced.

FIG. 7D is another diagram of 3 samples, isotropic taps 720, for approximating the anisotropic footprint in accordance with one or more aspects of the present invention. Isotropic taps 720 completely cover axis of anisotropy 700 and, in fact, extend beyond axis of anisotropy 700. When the modified number of samples is greater than or equal to the number of samples, the samples may extend beyond axis of anisotropy 700, potentially resulting in the introduction of visual artifacts such as blurring.

Isotropic taps 720 may be repositioned using spread compensation, as described in conjunction with FIG. 7F, to cover only the length of axis of anisotropy 700. The result of such a repositioning is shown in FIG. 7E, where the repositioned isotropic taps 720 are depicted as spread compensated isotropic taps 723. Decreasing the spacing between each sample may reduce image artifacts and improve image quality without requiring additional samples.

FIG. 7F illustrates an embodiment of a method for performing spread compensation to reposition texture samples along an anisotropic axis for anisotropic filtering in accordance with one or more aspects of the present invention. In step 750 an unoptimized number of samples is computed using the anisotropic parameter, e.g. logratio, anisotropic ratio, or the like, before any optimizations are applied. Optimizations that may be applied to modify the anisotropic parameter and/or the number of samples include rounding rules, mipmap limiting, angle optimizations, uv optimizations, and other techniques known to those skilled in the art.

In step 755 a sample spread value is computed by dividing the unoptimized number of samples computed in step 750 by the modified number of samples computed using one or more optimizations. In step 760 the samples are repositioned based on the sample spread value. Specifically, the distance between samples may be increased or decreased so that the samples are evenly distributed along the axis of anisotropy for a pixel. In step 765 the spread compensation optimization is complete. Persons skilled in the art will appreciate that any system configured to perform the method steps of FIG. 7F or their equivalents, is within the scope of the present invention.

Figure 8:
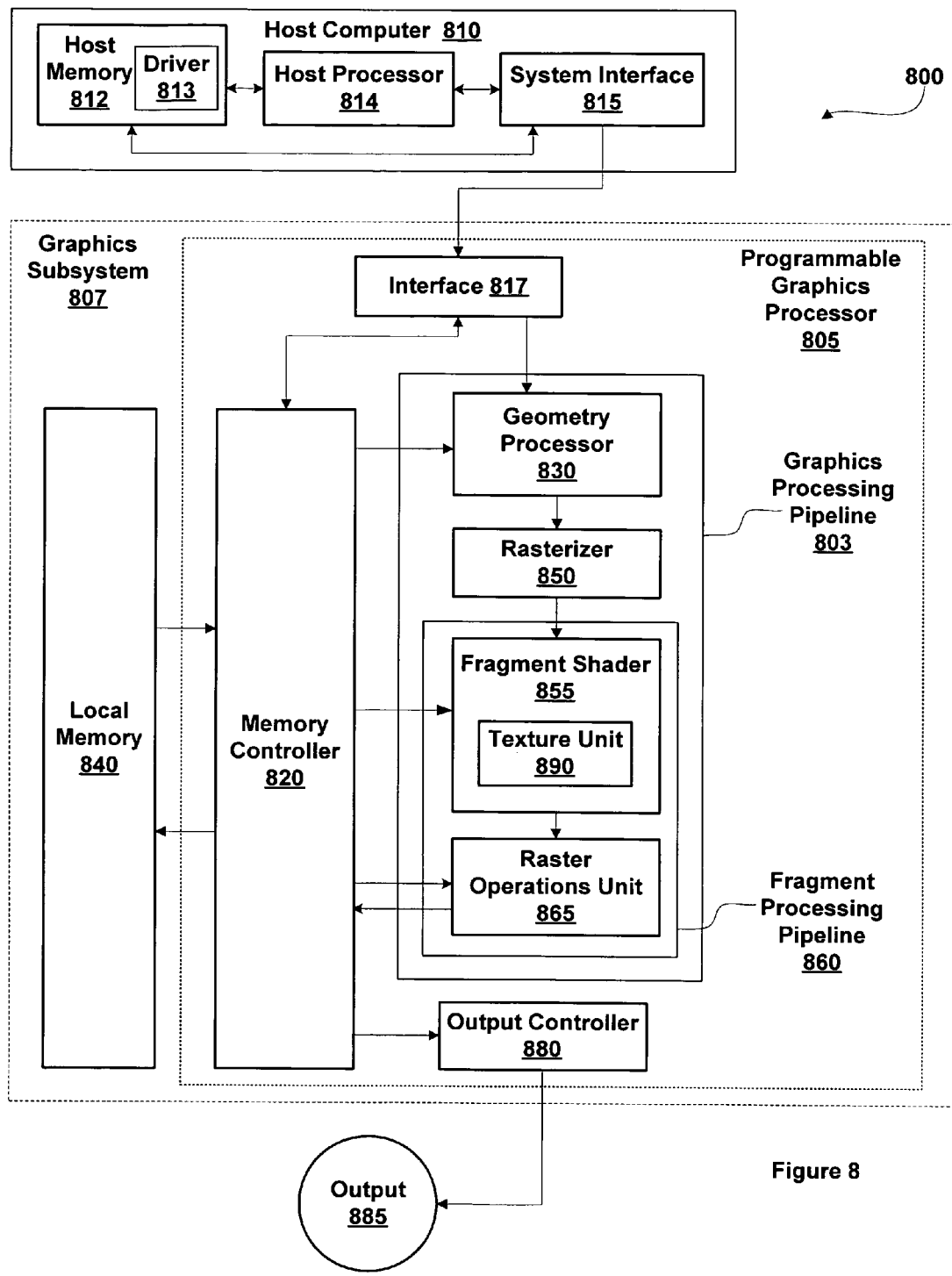
FIG. 8 is a block diagram of an exemplary embodiment of a respective computer system in accordance with one or more aspects of the present invention including a host computer and a graphics subsystem.

FIG. 8 is a block diagram of an exemplary embodiment of a respective computer system, generally designated 800, and including a host computer 810 and a graphics subsystem 807 in accordance with one or more aspects of the present invention. Computing system 800 may be a desktop computer, server, laptop computer, palm-sized computer, tablet computer, game console, portable wireless terminal such as a PDA or cellular telephone, computer based simulator, or the like. Host computer 810 includes host processor 814 that may include a system memory controller to interface directly to host memory 812 or may communicate with host memory 812 through a system interface 815. System interface 815 may be an I/O (input/output) interface or a bridge device including the system memory controller to interface directly to host memory 812. An example of system interface 815 known in the art includes Intel® Northbridge.

A graphics device driver, driver 813, interfaces between processes executed by host processor 814, such as application programs, and a programmable graphics processor 805, translating program instructions as needed for execution by programmable graphics processor 805. Driver 813 also uses commands to configure sub-units within programmable graphics processor 805. Specifically, driver 813 may enable or disable various anisotropic texture mapping optimizations and specify texture state variables for each texture map.

Graphics subsystem 807 includes a local memory 840 and programmable graphics processor 805. Host computer 810 communicates with graphics subsystem 870 via system interface 815 and a graphics interface 817 within programmable graphics processor 805. Data, program instructions, and commands received at graphics interface 817 can be passed to a graphics processing pipeline 803 or written to a local memory 840 through memory management unit 820. Programmable graphics processor 805 uses memory to store graphics data, including texture maps, and program instructions, where graphics data is any data that is input to or output from computation units within programmable graphics processor 805. Graphics memory is any memory used to store graphics data or program instructions to be executed by programmable graphics processor 805. Graphics memory can include portions of host memory 812, local memory 840 directly coupled to programmable graphics processor 805, storage resources coupled to the computation units within programmable graphics processor 805, and the like. Storage resources can include register files, caches, FIFOs (first in first out memories), and the like.

In addition to Interface 817, programmable graphics processor 805 includes a graphics processing pipeline 803, a memory controller 820 and an output controller 880. Data and program instructions received at interface 817 can be passed to a geometry processor 830 within graphics processing pipeline 803 or written to local memory 840 through memory controller 820. In addition to communicating with local memory 840, and interface 817, memory controller 820 also communicates with graphics processing pipeline 803 and output controller 880 through read and write interfaces in graphics processing pipeline 803 and a read interface in output controller 880.

Within graphics processing pipeline 803, geometry processor 830 and a programmable graphics fragment processing pipeline, fragment processing pipeline 860, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 830 and fragment processing pipeline 860 are optionally configured such that data processing operations are performed in multiple passes through graphics processing pipeline 803 or in multiple passes through fragment processing pipeline 860. Each pass through programmable graphics processor 805, graphics processing pipeline 803 or fragment processing pipeline 860 concludes with optional processing by a raster operations unit 865.

Vertex programs are sequences of vertex program instructions compiled by host processor 814 for execution within geometry processor 830 and rasterizer 850. Shader programs are sequences of shader program instructions compiled by host processor 814 for execution within fragment processing pipeline 860. Geometry processor 830 receives a stream of program instructions (vertex program instructions and shader program instructions) and data from interface 817 or memory controller 820, and performs vector floating-point operations or other processing operations using the data. The program instructions configure subunits within geometry processor 830, rasterizer 850 and fragment processing pipeline 860. The program instructions and data are stored in graphics memory, e.g., portions of host memory 812, local memory 840, or storage resources within programmable graphics processor 805. When a portion of host memory 812 is used to store program instructions and data the portion of host memory 812 can be uncached so as to increase performance of access by programmable graphics processor 805. Alternatively, configuration information is written to registers within geometry processor 830, rasterizer 850 and fragment processing pipeline 860 using program instructions, encoded with the data, or the like.

Data processed by geometry processor 830 and program instructions are passed from geometry processor 830 to a rasterizer 850. Rasterizer 850 is a sampling unit that processes primitives and generates sub-primitive data, such as fragment data, including parameters associated with fragments (texture identifiers, texture coordinates, and the like). Rasterizer 850 converts the primitives into sub-primitive data by performing scan conversion on the data processed by geometry processor 830. Rasterizer 850 outputs fragment data and shader program instructions to fragment processing pipeline 860.

The shader programs configure the fragment processing pipeline 860 to process fragment data by specifying computations and computation precision. Fragment shader 855 is optionally configured by shader program instructions such that fragment data processing operations are performed in multiple passes within fragment shader 855. Fragment shader 855 includes texture unit 890 to perform anisotropic or isotropic texture mapping and produce filtered texels. Texture unit 890 approximates anisotropic footprints and may be configured to perform optimizations to produce textured fragments while balancing image quality and performance, as described in conjunction with FIG. 9. The textured fragments are processed using techniques known to those skilled in the art to produce shaded fragment data.

Fragment shader 855 outputs the shaded fragment data, e.g., color and depth, and codewords generated from shader program instructions to raster operations unit 865. Raster operations unit 865 includes a read interface and a write interface to memory controller 820 through which raster operations unit 865 accesses data stored in local memory 840 or host memory 812. Raster operations unit 865 optionally performs near and far plane clipping and raster operations, such as stencil, z test, blending, and the like, using the fragment data and pixel data stored in local memory 840 or host memory 812 at a pixel position (image location specified by x,y coordinates) associated with the processed fragment data. The output data from raster operations unit 865 is written back to local memory 840 or host memory 812 at the pixel position associated with the output data and the results, e.g., image data are saved in graphics memory.

When processing is completed, an output 885 of graphics subsystem 807 is provided using output controller 880. Alternatively, host processor 814 reads the image stored in local memory 840 through memory controller 820, interface 817 and system interface 815. Output controller 880 is optionally configured by opcodes to deliver data to a display device, network, electronic control system, other computing system 800, other graphics subsystem 807, or the like.

Figure 9:
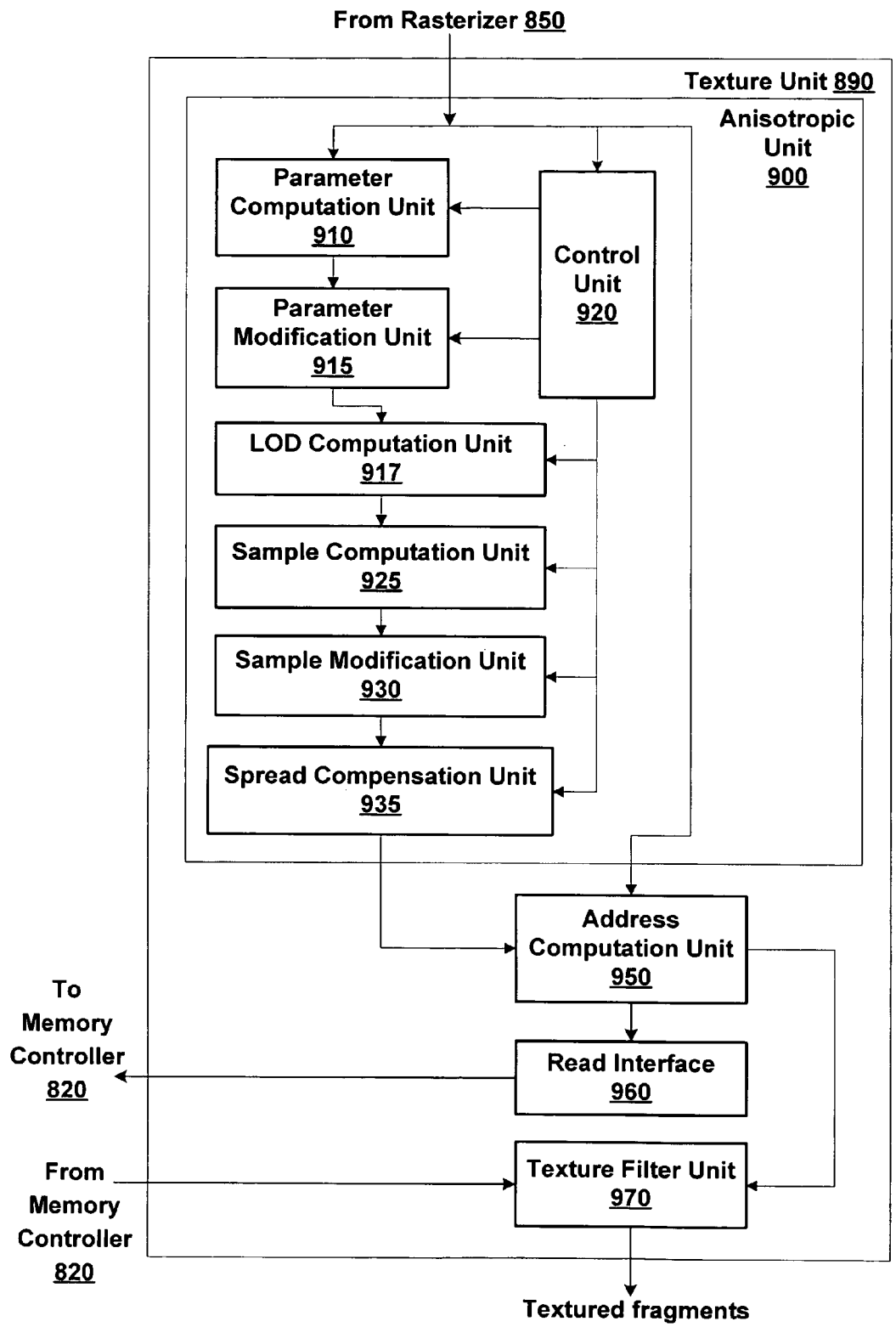
FIG. 9 is a block diagram of an exemplary embodiment of the texture unit from FIG. 8 in accordance with one or more aspects of the present invention.

FIG. 9 is a block diagram of an exemplary embodiment of texture unit 890 from FIG. 8 in accordance with one or more aspects of the present invention. In some embodiments, Texture unit 890 receives data, e.g., program instructions, texture state variables, and parameters associated with fragments (texture identifiers, texture coordinates such as s, t, and r, and the like) from a rasterizer, such as rasterizer 850. Texture coordinates s, t, and r are typically represented in a floating point format such as a 32 bit format (1 bit sign, 23 bit mantissa, and 8 bit exponent). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments. Texture unit 890 receives texture coordinates from a rasterizer, uses the texture coordinates to perform anisotropic texture filtering of texels read from memory, and then outputs textured fragments.

Texture unit 890 includes an anisotropic unit 900. At a high level, anisotropic unit 900 computes anisotropic texture mapping parameters such as LODt, the logratio and/or anisotropic ratio, and the axis of anisotropy. As previously described, these anisotropic texture mapping parameters are used to determine the number, position, and weight of isotropic taps and texels to perform texture filtering for a pixel. Anisotropic unit 900 outputs unnormalized texture coordinates, such as u, v, and p, that are dependent on mipmap dimensions for LODcoarse and LODfine and that are typically represented in a fixed point format. Anisotropic unit 900 also outputs sample locations, weights, LODfrac, LODfine, and LODcoarse.

A control unit 920 within anisotropic unit 900 processes the program instructions and texture state variables, to initiate computation of the anisotropic texture mapping parameters. A parameter computation unit 910 computes an anisotropic parameter, e.g., logratio, anisotropic ratio, or the like, using techniques known to those skilled in the art. For example, parameter computation unit 910 may perform step 210 described in conjunction with FIG. 2. Parameter computation unit 910 may also compute the axis of anisotropy, the length of the axis of anisotropy, and the like.

A parameter modification unit 915 receives the anisotropic parameter produced by parameter computation unit 910 and optionally modifies the anisotropic parameter to produce a modified anisotropic parameter. For example, parameter modification unit 915 may perform step 220 described in conjunction with FIG. 2. Control unit 920 provides texture state variables to parameter modification unit 915 indicating which optimizations are enabled and should be applied to produce the modified anisotropic parameter. In some embodiments of the present invention, angle optimization unit 500 is included within parameter modification unit 915 and may be configured using the texture state variables to perform angle optimization to produce the modified anisotropic parameter. Furthermore, the texture state variables received from control unit 920 may indicate which of the four LUTs that may be included within angle optimization unit 500 should be read to obtain the angle bias value.

In some embodiments of the present invention, parameter modification unit 915 is configured to apply other optimizations, such as an anisotropic bias to fatten the footprint, to produce the modified anisotropic parameter. Parameter modification unit 915 may be configured to apply two or more optimizations based on the texture state variables received from control unit 920. Parameter modification unit 915 outputs the modified anisotropic parameter, the axis of anisotropy, the unoptimized length of the axis of anisotropy, texture coordinates, and the like, to an LOD computation unit 917.

LOD computation unit 917 may be configured to optionally clamp the modified anisotropic parameter, performing step 230 of FIG. 2, prior to computing LODt. LOD computation unit 917 may also be configured by control unit 920 to compute LOD values, e.g., LODfine, LODcoarse, and LODfrac using techniques known to those skilled in the art. A sample computation unit 925 receives the modified (and optionally clamped) anisotropic parameter, the axis of anisotropy, the unoptimized length of the axis of anisotropy, the unnormalized texture coordinates and LOD values from LOD computation unit 917.

Sample computation unit 925 computes the number of isotropic taps, sample count, based on the modified anisotropic parameter. For example, sample computation unit 925 may be configured by control unit 920 to perform step 240 of FIG. 2. Sample computation unit 925 may also determine a first number of texels to be read from the mipmap specified by LODfine and a second number of texels to be read from the mipmap specified by LODcoarse. Sample computation unit 925 determines the locations, e.g., and unnormalized texture coordinates, such as u, v, and p, of the texels. The texels are read by read interface 960 from the level specified by LODfine and the level specified by LODcoarse are bilinearly or trilinearly filtered in a texture filter unit 970 to produce each isotropic tap value, e.g., sample. Sample computation unit 925 also computes weights, using techniques known to those skilled in the art, for use during filtering of the isotropic tap values.

Sample computation unit 925 outputs a sample count, sample locations, weights, LOD values, the axis of anisotropy, and the unoptimized length of the axis of anisotropy to a sample modification unit 930. Sample modification unit 930 optionally modifies the sample count to produce a modified number of samples. For example, sample modification unit 930 may perform step 250 described in conjunction with FIG. 2. Control unit 920 provides texture state variables to sample modification unit 930 indicating which optimizations are enabled and should be applied to produce the modified number of samples. In some embodiments of the present invention, sample modification unit 930 may be configured using the texture state variables to perform one of more optimizations, such as the rounding rule optimization, the mipmap limiting optimization, and the uv optimization to produce the modified number of samples.

Sample modification unit 930 outputs the modified number of samples, sample locations, weights, LOD values, the axis of anisotropy, and the unoptimized length of the axis of anisotropy to a spread compensation unit 935. Spread compensation unit optionally modifies the sample locations based on the unoptimized length of the axis of anisotropy and the length of the axis of anisotropy after any optimizations are applied to modify the number of samples and/or anisotropic parameter. For example, spread compensation unit 935 may by configured by control unit 920 to perform steps 750, 755, 760, and 765 described in conjunction with FIG. 7F.

In some embodiments of the present invention, the texture state variables may specify spread compensation values which are applied to the sample locations to produce modified sample locations. For example, per sample horizontal, diagonal, and or vertical spacings may be specified and applied by spread compensation unit 935 to increase or decrease the spacing between the samples. In these embodiments of the present invention, the sample spread value is not computed by spread compensation unit 935.

Spread compensation unit 935 outputs the modified sample locations, weights, and LOD values, to an address computation unit 950. Address computation unit 950 uses the modified sample locations and texture parameters (texture identifier, and the like) received by texture unit 890 to determine addresses for reading texels (the first number of texels or the first and the second number of texels) from memory, e.g., local memory 840, host memory 812, or the like. Address computation unit 950 outputs the addresses to read interface 960. Read interface 960 outputs the addresses and a read request to memory controller 820.

Texels read from memory are received from memory controller 820 by texture filter unit 970. Texture filter unit 970 receives the LODfrac and fractional portions of the modified sample locations from address computation unit 950 and filters the texels read from memory to produce isotropic taps. The isotropic taps are then filtered using the weights received from address computation unit 950 to produce textured fragments. The textured fragments are further processed within a fragment shader, to compute a color for each fragment.

In some embodiments of anisotropic unit 900 one or more of the optimization units, e.g., parameter modification unit 915, sample modification unit 930, and spread compensation unit 935, may be omitted. In other embodiments of anisotropic unit 900 additional units may be included to perform other optimizations known to those skilled in the art.

Figure 10:
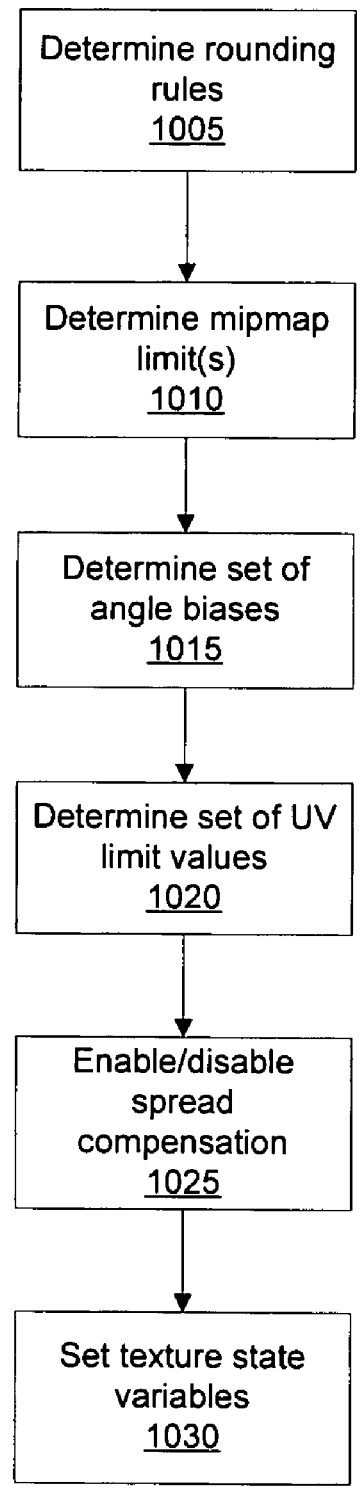
FIG. 10 illustrates an embodiment of a method for setting texture state variables for anisotropic filtering in accordance with one or more aspects of the present invention.

FIG. 10 illustrates an embodiment of a method for setting texture state variables for anisotropic filtering in accordance with one or more aspects of the present invention. A set of texture state variables may be determined for each texture map based on the specific characteristics of the texture map. For some optimization techniques, the texture state variables may be determined based on a configuration mode that is provided directly or indirectly by a user through selection of a high performance mode, high image quality mode, or another mode specifying a balance between performance and image quality. For other optimization techniques, the texture state variables may be determined based on the texture identifier (texture ID) independent of the configuration mode. For still other optimization techniques, the texture state variables may be determined based on a combination of the texture ID and the configuration mode. The texture state variables for a particular texture map may be determined by a driver, such as driver 813, an analysis program, visual inspection, or the like.

In step 1005, the rounding rules for the texture map is determined by driver 813 based on the configuration mode and/or the texture ID. Driver 813 enables the rounding rule optimization based on the configuration mode and/or the texture ID. In some embodiments of the present invention, rounding rules include round up to nearest even, round down to nearest even, round up to nearest power of 2, and round down to nearest power of 2.

In step 1010 one or more mipmap limits are determined by driver 813 based on the configuration mode and/or texture ID. Driver 813 enables mipmap limiting optimization based on the configuration information and/or the texture ID. In step 1015 a set of angle biases are determined by driver 813 based on the configuration mode and/or texture ID. Driver 813 enables the angle optimization based on the configuration information and/or the texture ID. In step 1020 a set of uv limit values are determined by driver 813 based on the configuration mode and/or texture ID. Driver 813 enables the uv optimization based on the configuration information and/or the texture ID.

In step 1025 driver 813 enables sample spread compensation optimization based on the configuration information and/or texture ID. In step 1030 driver 813 sets the texture state variables accordingly to enable or disable each anisotropic texture filtering optimization, e.g., rounding rule, mipmap limiting, angle, uv, and sample spread compensation optimization. In step 1030 driver 813 also sets the texture state variables accordingly to select a set of values, e.g. angle, uv, or the like, or optimization configuration, round to nearest even, mipmap limit, or the like. In other embodiments of the present invention, one or more of steps 1005, 1010, 1015, 1020, and 1025 may be omitted. In some embodiments of the present invention, one or more additional steps may be included to determine whether or not to enable other optimizations. Persons skilled in the art will appreciate that any system configured to perform the method steps of FIG. 10 or their equivalents, is within the scope of the present invention.

Various systems and methods may be used to modify an anisotropic parameter and modify the number of texture samples used to produce an anisotropically filtered texture mapped pixel. Furthermore, the texture samples may be repositioned along an axis of anisotropy using a spread compensation optimization to approximate an elliptical footprint, ensuring that the texture samples span the entire axis of anisotropy. The optimizations may be dynamically controlled by a driver to improve texture mapping performance or image quality. The driver may select a set of texture state variables to dynamically control the optimizations enabled and optimization values used for each texture map.

While the foregoing is directed to embodiments of the present invention, other and further embodiments of the invention may be devised without departing from the basic scope thereof, and the scope thereof is determined by the claims that follow. Specifically, persons skilled in the art will recognize that the anisotropic texture mapping optimization techniques set forth herein may be implemented either partially or entirely in a software program or a shader program executed by fragment shader 855. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of determining anisotropic texture map sample positions, comprising:
   computing an optimized number of texture map samples aligned along a major axis of anisotropy;
   computing an unoptimized number of texture map samples aligned along the major axis of anisotropy; and
   repositioning the optimized number of texture map samples along the major axis of anisotropy based on a ratio between the unoptimized number of texture map samples and the optimized number of texture map samples.

2. The method of claim 1, wherein the step of computing the optimized number of texture map samples includes using a set of texture state variables that are specific to a texture map.

3. The method of claim 2, further comprising the step of determining the set of texture state variables associated with the unoptimized number of anisotropic texture map samples based on texels within the texture map.

4. The method of claim 1, wherein the step of computing the optimized number of texture map samples includes adding an anisotropic bias to an anisotropic parameter.

5. The method of claim 1, wherein the step of computing the optimized number of texture map samples includes modifying a computed anisotropic parameter that is based on the major axis of anisotropy and a minor axis of anisotropy.

6. The method of claim 1, wherein the step of computing the optimized number of texture map samples includes rounding a texture map sample count up or down to a nearest even number.

7. The method of claim 1, wherein the step of computing the optimized number of texture map samples includes rounding a sample count up or down to a nearest log base two number.

8. The method of claim 1, wherein the step of computing the optimized number of texture map samples includes using a mipmap resolution limit.

9. The method of claim 1, wherein the step of computing the optimized number of texture map samples includes using an angle bias.

10. The method of claim 1, further comprising the step of computing a level of detail parameter using an angle bias to modify a ratio of a length of a minor axis of anisotropy to a length of the major axis of anisotropy.

11. The method of claim 1, wherein the step of computing the optimized number of texture map samples includes using a texture coordinate limit value.

12. The method of claim 1, wherein the optimized number of texture map samples is greater than the unoptimized number of texture map samples.

13. A system for determining anisotropic texture map sample positions, comprising:
  means for computing an optimized number of texture map samples aligned along a major axis of anisotropy;
  means for computing an unoptimized number of texture map samples aligned along the major axis of anisotropy; and
  means for repositioning the optimized number of texture map samples along the major axis of anisotropy based on a ratio between the unoptimized number of texture map samples and the optimized number of texture map samples.

14. The system of claim 13, wherein the means for computing the optimized number of texture map samples uses a set of texture state variables that are specific to a texture map.

15. The system of claim 13, wherein the means for computing the optimized number of texture map samples includes means for modifying a computed anisotropic parameter that is based on the major axis of anisotropy and a minor axis of anisotropy.

16. The system of claim 13, wherein the means for computing the optimized number of texture map samples includes means for rounding a texture map sample count up or down.

17. The system of claim 13, wherein the means for computing the optimized number of texture map samples includes means for using a mipmap resolution limit.

18. The system of claim 13, wherein the means for computing the optimized number of texture map samples includes means for using an angle bias.

19. The system of claim 13, further comprising means for determining an angle bias to modify a ratio of a length of a minor axis of anisotropy to a length of the major axis of anisotropy.

20. The system of claim 13, wherein the means for computing the optimized number of texture map samples includes means for using a texture coordinate limit value.

* * * * *